United States Patent
Alberts et al.

(10) Patent No.: US 11,739,730 B2
(45) Date of Patent: Aug. 29, 2023

(54) METHOD FOR OPERATING AN ELECTRIC MACHINE USING A DYNAMIC CAPACITY CURVE

(71) Applicant: Siemens Gamesa Renewable Energy A/S, Brande (DK)

(72) Inventors: Johannes Gerhardes Wardjan Alberts, Brøndby Strand (DK); Martin Folmer Andersen, København (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 101 days.

(21) Appl. No.: 17/607,427

(22) PCT Filed: Apr. 1, 2020

(86) PCT No.: PCT/EP2020/059295
§ 371 (c)(1),
(2) Date: Oct. 29, 2021

(87) PCT Pub. No.: WO2020/221541
PCT Pub. Date: Nov. 5, 2020

(65) Prior Publication Data
US 2022/0220939 A1     Jul. 14, 2022

(30) Foreign Application Priority Data
May 2, 2019  (EP) ..................... 19172175

(51) Int. Cl.
*F03D 7/02*  (2006.01)
*F03D 15/00*  (2016.01)
(Continued)

(52) U.S. Cl.
CPC ........... *F03D 7/0296* (2013.01); *F03D 7/028* (2013.01); *F03D 15/00* (2016.05); *H02P 9/105* (2013.01);
(Continued)

(58) Field of Classification Search
CPC ........ F03D 7/0296; F03D 15/00; F03D 7/028; H02P 9/105; H02P 2101/15; F05B 2220/706; F05B 2260/964
See application file for complete search history.

(56) References Cited

U.S. PATENT DOCUMENTS

2007/0018457 A1   1/2007   Llorente Gonzalez

FOREIGN PATENT DOCUMENTS

DE      10 2006 014121 A1    12/2006
EP         1 643 122 A2       4/2006
(Continued)

OTHER PUBLICATIONS

PCT International Search Report & Written Opinion dated Jul. 9, 2020 corresponding to PCT International Application No. PCT/EP2020/059295.

(Continued)

*Primary Examiner* — Viet P Nguyen
(74) *Attorney, Agent, or Firm* — Schmeiser, Olsen & Watts LLP

(57) ABSTRACT

A method for operating an electric machine (in particular a wind turbine) having a generator with a rotor and a stator is provided. The method includes: i) evaluating an active damping applied to the electric machine, ii) estimating a damping criterion from the evaluated applied active damping, and iii) shifting a dynamic capacity curve towards a maximum allowed level. The maximum allowed level is based on the damping criterion and a first operation criterion and/or a second operation criterion. Furthermore, the dynamic capacity curve is a dynamic power capacity curve or a dynamic torque capacity curve.

20 Claims, 1 Drawing Sheet

(51) Int. Cl.
*H02P 9/10* (2006.01)
*H02P 101/15* (2016.01)

(52) U.S. Cl.
CPC ... *F05B 2220/706* (2013.01); *F05B 2260/964* (2013.01); *H02P 2101/15* (2015.01)

(56) References Cited

FOREIGN PATENT DOCUMENTS

| EP | 2 541 050 A2 | 1/2013 |
| EP | 2 927 486 A1 | 10/2015 |

OTHER PUBLICATIONS

Ermis M et al: "Autonomous Wind Energy Conversion System With a Simple Controller for Maximum-Power Transfer", IEE Proceedings B. Electrical Power Applications, 1271980 1, vol. 139, No. 5 Part B, Sep. 1, 1992 (Sep. 1, 1992), pp. 421-428, XP000320149.
Anca Hansen et al: "General rights Copyright and moral rights for Dynamic wind turbine models in power system simulation tool DigSILENT", Riso Nationallaboratoriet for Baeredygtig Energi. Denmark. Forskningscenter Risoe. Risoe-R, Jan. 1, 2007 (Jan. 1, 2007), p. 1440, XP055630672, Retrieved from the Internet: URL:https://orbit.dtu.dk/files/7703047/risr_1400_ed2.pdf.

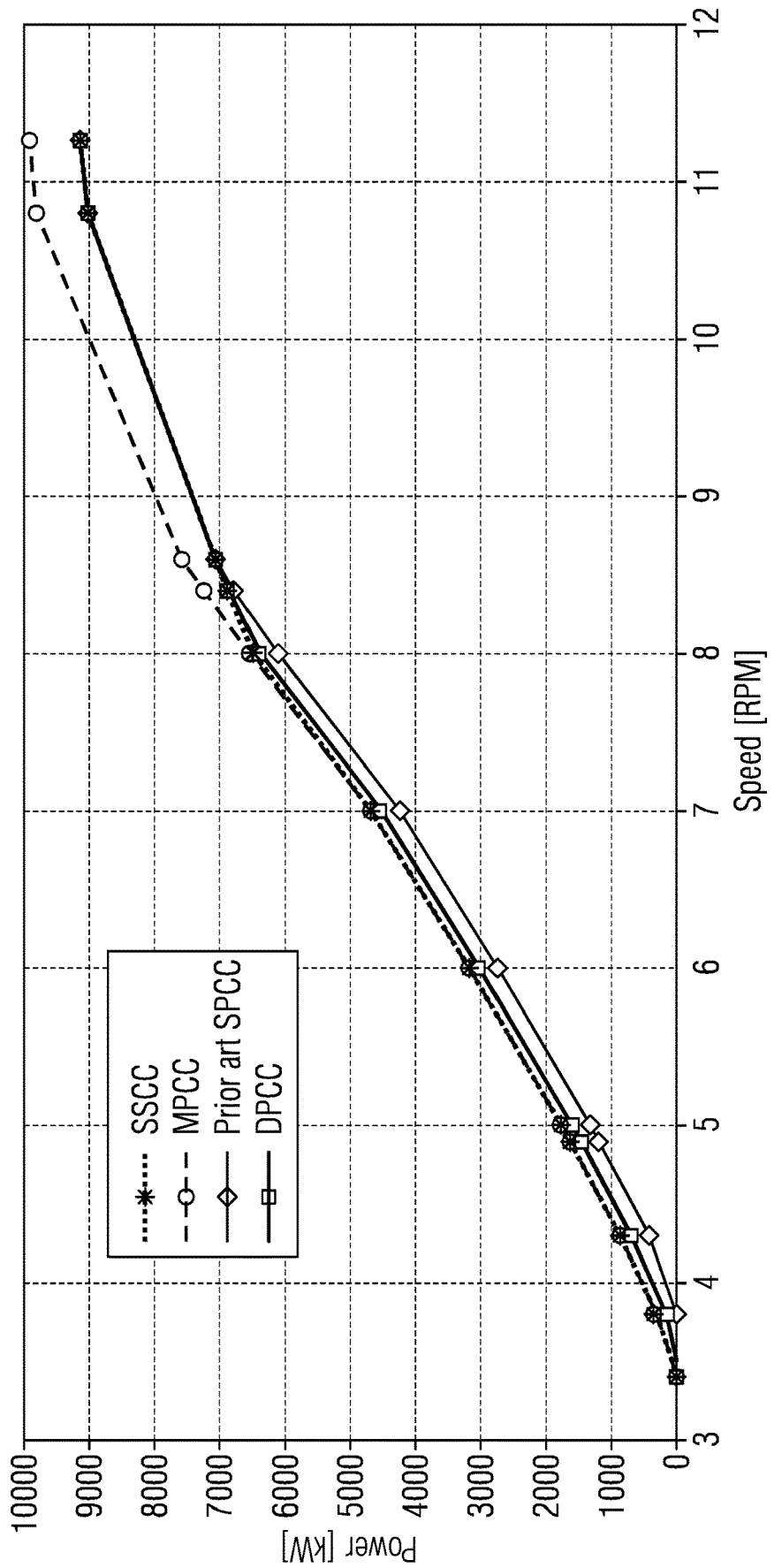

METHOD FOR OPERATING AN ELECTRIC MACHINE USING A DYNAMIC CAPACITY CURVE

CROSS-REFERENCE TO RELATED APPLICATIONS

This application claims priority to PCT Application No. PCT/EP2020/059295, having a filing date of Apr. 1, 2020, which claims priority to EP Application No. 19172175.2, having a filing date of May 2, 2019, the entire contents both of which are hereby incorporated by reference.

FIELD OF TECHNOLOGY

The following relates to the field of methods for operating an electric machine having a generator, in particular wind turbines. Furthermore, the following relates to a wind turbine with an operating system that is configured to perform the described method.

BACKGROUND

Electric machines that comprise a generator (having a rotor and a stator) are often operated using a power capacity curve (also termed power curve or power envelope). Hereby, the power capacity curve may reflect the relation between the produced power (for example in Watt) and the speed of the rotor of the generator (for example in RPM) (or the wind speed). In general, the higher the rotor speed is, the higher will be the produced power. Hence, the power capacity curve increases with higher rotor speed. In a similar manner, the electric machine may be operated using a torque capacity curve which may be used in order to reflect the relation between e.g., the rotor speed and the torque.

However, in many technical fields (e.g., energy production using wind turbines), the produced power (and/or the torque) has to be limited due to operational stability and material fatigue. In order to achieve this, active power and/or torque damping can be performed, for example by pitching the blades of a wind turbine. Hence, the power capacity curve has to define a maximum operation power limit depending on several parameters such as rotor speed, temperature, active power damping and material stability (e.g., of the generator).

According to the conventional art, the power (or torque) capacity curve is a static curve that is based on the rotor speed only. This static power capacity curve limits a steady state power capacity curve (reference) from a power control system.

However, this conventional art technique causes several issues: at low rotor speeds, the static power capacity curve is very conservative, as a required power damping is only a fraction of what is assumed and is included in the calculation of the power capacity curve. Since the power capacity curve is static, the unexploited part of the power damping is lost at (in particular low) speeds, wherein the required power damping is below a damping budget.

As a consequence of this circumstance, a resonance speed avoider (RSA), which increases power to prevent a wind turbine from operating too close to the resonance of the 3rd harmonic rotor frequency and the tower frequency, needs more power at low speeds, but is limited by the static power capacity curve.

There may be a need for operating an electric machine (in particular a wind turbine) in a robust and stable manner, while providing an optimal power production.

SUMMARY

An aspect relates to a method for operating an electric machine (in particular a wind turbine) having a generator with a rotor and a stator. The method comprises: i) evaluating an active damping (power damping and/or torque damping) applied to the electric machine, ii) (dynamically/continuously) deriving (estimating) a damping criterion from the evaluated applied active damping (in other words: estimate or measure the active damping term sent to the power or torque reference and estimate the size of the damping), and iii) (dynamically/continuously) shifting a dynamic capacity curve towards a maximum allowed level (e.g., maximum allowed power level or maximum allowed torque level). Hereby, the maximum allowed level is based on the damping criterion and a first operation criterion and/or a second operation criterion. Furthermore, the dynamic capacity curve is a dynamic power capacity curve and/or a dynamic torque capacity curve.

According to a second aspect of embodiments of the invention, there is provided a wind turbine, comprising: i) a generator having a rotor and a stator, and ii) an operating system, wherein the operating system is configured to perform the method described above.

According to an exemplary embodiment, the invention may be based on the idea that an electric machine (in particular a wind turbine) can be operated in a robust and stable manner, while providing an optimal power production, when a dynamic capacity curve (a power capacity curve or a torque capacity curve) is applied that continuously takes into account an evaluation of applied active damping (to the electric machine) and continuously updates (estimates) a damping criterion. The damping criterion is then used to dynamically shift the capacity curve towards a maximum allowed level. The maximum allowed level is based on the damping criterion and on at least a first criterion that reflects the maximum power/torque capacity (e.g., a stability limit of the generator) and/or a second criterion that reflects the steady state capacity (e.g., fatigue limits of wind turbine components).

In the described manner, a dynamic capacity curve is provided that may be optimized for medium and low rotor speeds, and may enable the most optimal possible capacity curve throughout the entire operation region.

According to an embodiment of the invention, the first operation criterion comprises a maximum power capacity curve or a maximum torque capacity curve. This may provide the advantage that the maximum allowable power/torque can be directly taken into account, when dynamically shifting the dynamic capacity curve.

For example, the maximum power capacity curve (or peak power envelope) may be defined by converter and/or generator stability limits that ensure a healthy instantaneous operation.

According to a further embodiment of the invention, the definition of the first operation criterion comprises a stability limit (in particular of the generator and/or a converter). This may provide the advantage that the stability limit of the generator (and/or a converter), which actually limits the maximum power/torque, is taken into account.

The stability limit may for example comprise a temperature, a critical temperature, or a current limit.

According to a further embodiment of the invention, the second operation criterion comprises a steady state capacity curve. This may provide the advantage that the healthy sustained operation of one or more components of the electric machine (or wind turbine) can be directly taken into account, when dynamically shifting the capacity curve.

The steady state capacity curve may be, among others, defined by component temperature limits that ensures healthy sustained operation. The steady state capacity curve may consider material fatigue, especially at high temperatures. As a consequence, the second operation criterion may only be relevant at higher rotor speeds, when e.g., the increase in torque elevates the temperature of components.

According to a further embodiment of the invention, the definition of the steady state capacity curve comprises a (component) fatigue limit (in particular one or more (electric machine) component fatigue limits).

The steady state capacity curve may comprise at least one of the groups consisting of: a temperature limit, a vibration limit, a current limit (of a component of the electric machine, respectively). Hence, the fatigue limits of these components can be considered, especially at higher power and/or torque levels.

According to a further embodiment of the invention, the damping criterion comprises an allowed damping budget of active power damping or active torque damping. In particular, the damping criterion comprises a damping feature that uses a ripple on power or torque. More in particular, active damping comprises active tower damping and/or active drive train damping. This may provide the advantage that the (continuously updated) active damping can be directly taken into account, when dynamically shifting the capacity curve. Hereby, for example, established and robust methods such as the active tower damping and active drive train damping can be implemented in a straightforward manner.

According to a further embodiment of the invention, the maximum allowed level comprises at least one of the group consisting of: a rotor speed, a temperature limit, a damping budget, a stability limit of the generator and/or the converter. In particular, the maximum allowed level is based on a maximum allowed power level and/or a maximum allowed torque level. This may provide the advantage that the maximum allowed level can be adapted in a flexible manner to important aspects and current issues.

According to a further embodiment of the invention, the method further comprises, at low rotor speeds, shifting the dynamic capacity curve towards the first operation criterion, thereby using the damping criterion as a limitation. In particular the damping criterion is used as the exclusive (only) limitation. In other words: shifting the dynamic capacity curve towards the first operation criterion minus the damping criterion. This may provide the advantage that, at low rotor speeds, only the first criterion (next to the damping criterion) has to be taken into account and the method can be performed more efficient.

According to a further embodiment of the invention, the method further comprises, at high rotor speeds, shifting the dynamic capacity curve towards the first operation criterion, thereby using the damping criterion and the second operation criterion as a limitation. In other words: shifting the dynamic capacity curve to the first operation criterion minus the damping criterion and the second operation criterion. This may provide the advantage that, at high rotor speeds, where the temperature of components may increase, the temperature stability (in form of the second criterion) is considered specifically.

According to a further embodiment of the invention, the first operation criterion and the second operation criterion are essentially the same at low rotor speeds.

According to a further embodiment of the invention, the first operation criterion and the second operation criterion are essentially not the same at high rotor speeds.

At low rotor speeds, the steady state capacity curve and the maximum power/torque capacity curve may be more or less the same, whereas at high rotor speeds (nominal power) the steady state capacity curve may be lower than the maximum power/torque capacity curve.

The terms "low rotor speed" and "high rotor speed" depend on the applied generator and its environment. In an exemplary embodiment, wherein the generator is part of a wind turbine, a speed range between 1 and 7.5 RPM may be considered as low (up to medium) speed, while a speed range between 7.5 and 12 RPM may be considered as (medium up to) high speed.

According to a further embodiment of the invention, the method further comprises applying a resonance speed avoidance (RSA) feature to the electric machine. This may provide the advantage that an established and robust wind turbine feature may be implemented in an efficient manner, while its performance can be increased.

The RSA increases power to prevent a wind turbine from operating too close to resonance of the 3rd harmonic rotor frequency and the tower frequency and requires power especially at low speeds. Using the method described above, the RSA may have an expanded range of operation.

According to a further embodiment, the wind turbine is a direct drive wind turbine or a gearbox wind turbine. This may provide the advantage that the described operating method can be directly implemented into established and robust systems.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of embodiments of the present invention are apparent from the examples of embodiment to be described hereinafter and are explained with reference to the examples of embodiment. The embodiments will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 shows a diagram with a dynamic power capacity curve according to an exemplary embodiment of the invention.

DETAILED DESCRIPTION

According to an exemplary embodiment, the method comprises: dynamically estimating the required damping budget (damping criterion) and dynamically shifting the power capacity curve (power envelope) up to the maximum allowed power production (maximum allowed level) based on a steady state capacity curve and a peak (maximum) power capacity curve.

According to a further exemplary embodiment, there is increased power available for specific features such as RSA (resonance speed avoider), thereby making those features more effective.

According to a further exemplary embodiment, a wind turbine is enabled to achieve annual energy production (AEP) optimized power levels for low rotor speeds.

The illustration in the drawing is schematic.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously, though, all such spatially relative terms refer to the orientation shown in the figures for ease of description and are not necessarily limiting as an apparatus according to an embodiment of the invention can assume orientations different than those illustrated in the figures when in use.

FIG. 1 shows a power capacity diagram of a wind turbine. On the abscissa, the rotor speed is shown in RPM (revolutions per minute). On the ordinate, the power production (in kilo Watts) is indicated. It goes without saying that the power production increases in dependence of the rotor speed. However, an active power damping is necessary with respect to stability limits of the generator and also regarding the temperature (which increases with higher power production) of components of the wind turbine. The capacity curve MPCC represents the maximum power capacity curve. The maximum power capacity curve (or first criterion) comprises the stability limit of the generator (and/or a converter (e.g., AC-DC-AC converter) of the wind turbine). This curve MPCC hence represents the absolute power limit. The capacity curve SSCC represents the steady state capacity curve (or second criterion) which comprises temperature (material fatigue) limits for components of the wind turbine. At low rotor speeds, the curves MPCC and SSCC are essentially the same, because at these low temperatures, in principle no temperature issues have to be taken into account. At higher rotor speeds, when the material temperatures increase, the curves MPCC and SSCC are not the same anymore (in the example around 8 RPM), wherein MPCC is then higher than SSCC.

Conventionally, a wind turbine is operated using a static power capacity curve which is shown as prior art SPCC. It can be seen from the diagram that, at low rotor speeds, the SPCC is much lower than MPCC and SSCC, thereby losing a high amount of power production. At high rotor speeds, the SPCC is essentially the same as SSCC. When increasing the static power capacity curve at low rotor speeds, this increases the risk for: i) driving the wind turbine into unstable operation which may result into shut-down, and/or ii) running the wind turbine at too high temperatures (in particular with respect to the components of the wind turbine), which results in shorter component lifetime and/or less power production.

In contrast to this prior art example, the above-described dynamic power capacity curve DPCC is very close to MPCC and SSCC even at low speeds. Thereby, power production is saved and the advantages described above can be provided in an efficient and robust manner. This difference to the prior art is in particular possible, because the DPCC is dynamically shifted towards the MPCC, taking into account a continuously (dynamically) updated power damping criterion (which is based on applied active power damping).

In the example of FIG. 1, the dynamic capacity curve has been described as a dynamic power capacity curve. However, the described example holds also true, when the dynamic capacity curve is a dynamic torque capacity curve.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating an electric machine having a generator with a rotor and a stator, the method comprising:
evaluating an active damping applied to the electric machine;
deriving a damping criterion from the evaluated applied active damping; and
shifting a dynamic capacity curve towards a maximum allowed level, wherein the maximum allowed level is based on the damping criterion and a first operation criterion; and
wherein the dynamic capacity curve is a dynamic power capacity curve or a dynamic torque capacity curve; and
wherein the method further comprises:
at low rotor speeds, shifting the dynamic capacity curve towards the first operation criterion, thereby using the damping criterion as a limitation.

2. The method as set forth in claim 1, wherein the first operation criterion comprises a maximum power capacity curve or a maximum torque capacity curve.

3. The method as set forth in claim 2, wherein the first operation criterion comprises:
a stability limit.

4. The method as set forth in claim 1, wherein the maximum allowed level is further based on a second operation criterion, wherein the second operation criterion comprises a steady state capacity curve.

5. The method as set forth in claim 4, wherein the steady state capacity curve comprises:
a fatigue limit.

6. The method as set forth in claim 4, wherein the first operation criterion and the second operation criterion are essentially the same at low rotor speeds.

7. The method as set forth in claim 4, wherein the first operation criterion and the second operation criterion are essentially not the same at high rotor speeds.

8. The method as set forth in claim 1, wherein the damping criterion comprises:
an allowed damping budget of active power damping or active torque damping.

9. The method as set forth in claim 1, wherein the maximum allowed level comprises a maximum allowed power level and/or a maximum allowed torque level.

10. The method as set forth in claim 1, wherein at low rotor speeds the damping criterion is used as an exclusive limitation.

11. The method as set forth in claim 1, wherein the method further comprises:
at high rotor speeds, shifting the dynamic capacity curve towards the first operation criterion, thereby using the damping criterion and the second operation criterion as a limitation.

12. The method as set forth in claim 1, wherein the method further comprises:
applying a resonance speed avoidance feature in the electric machine.

13. A wind turbine, comprising:
a generator having a rotor and a stator; and
an operating system, wherein the operating system is configured to:
evaluate an active damping applied to the wind turbine;
derive a damping criterion from the evaluated applied active damping; and
shift a dynamic capacity curve towards a maximum allowed level;
wherein the maximum allowed level is based on the damping criterion and a first operation criterion;
wherein the dynamic capacity curve is a dynamic power capacity curve or a dynamic torque capacity curve; and
wherein at low rotor speeds, the dynamic capacity curve is shifted towards the first operation criterion, thereby using the damping criterion as a limitation.

14. The wind turbine according to claim 13, wherein the wind turbine is a direct drive wind turbine or a gearbox wind turbine.

15. The wind turbine according to claim 13, wherein the first operation criterion comprises a maximum power capacity curve or a maximum torque capacity curve.

16. The wind turbine according to claim 13, wherein the maximum allowed level is further based on a second operation criterion, wherein the second operation criterion comprises a steady state capacity curve.

17. The wind turbine according to claim 13, wherein the damping criterion comprises: an allowed damping budget of active power damping or active torque damping.

18. The wind turbine according to claim 13, wherein the maximum allowed level comprises a maximum allowed power level and/or a maximum allowed torque level.

19. The wind turbine according to claim 13, wherein at low rotor speeds the damping criterion is used as an exclusive limitation.

20. The wind turbine according to claim 13, wherein the method further comprises:
at high rotor speeds, shifting the dynamic capacity curve towards the first operation criterion, thereby using the damping criterion and the second operation criterion as a limitation.

* * * * *